US011178215B1

(12) United States Patent
Kaukl et al.

(10) Patent No.: US 11,178,215 B1
(45) Date of Patent: Nov. 16, 2021

(54) TRANSPARENT SUPPORT AND TRANSLATION FOR CLIENT-PROVIDED IDENTIFIERS IN SERVICE REQUESTS

(71) Applicant: Amazon Technologies, Inc., Seattle, WA (US)

(72) Inventors: Christopher Vincent Kaukl, Sammamish, WA (US); Chris Predeek, Silverton, OR (US); Matthew M. Luker, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 16/364,060

(22) Filed: Mar. 25, 2019

(51) Int. Cl.
*H04L 29/08* (2006.01)
*G06F 16/901* (2019.01)
*H04L 9/06* (2006.01)
*H04L 29/06* (2006.01)

(52) U.S. Cl.
CPC .......... *H04L 67/10* (2013.01); *G06F 16/9017* (2019.01); *H04L 9/0643* (2013.01); *H04L 63/10* (2013.01)

(58) Field of Classification Search
CPC ....... H04L 67/10; H04L 9/0643; H04L 63/10; G06F 16/9017
See application file for complete search history.

(56) References Cited

U.S. PATENT DOCUMENTS

| 7,970,943 B2 | 6/2011 | Lin et al. |
| 8,180,794 B2 | 5/2012 | Plantenberg et al. |
| 9,633,209 B1* | 4/2017 | Johansson ........... H04L 63/0414 |
| 2019/0121518 A1* | 4/2019 | Anima ................ G06F 3/04842 |
| 2019/0205436 A1* | 7/2019 | Hemio ................. G06F 16/252 |

* cited by examiner

*Primary Examiner* — Arvin Eskandarnia
(74) *Attorney, Agent, or Firm* — Robert C. Kowert; Kowert, Hood, Munyon, Rankin & Goetzel, P.C.

(57) ABSTRACT

A translation service is used to modify service requests by translating client-provided external identifiers for objects into canonical identifiers for the objects (e.g., an identifier used by the service to uniquely identify the one or more objects). The translation service first receives specification data for a particular service. The specification data includes information for translating external identifiers for one or more objects to canonical identifiers for the one or more objects. The translation service instantiates a translation layer for the particular service, based on the received specification data. The translation layer receives a request directed to the particular service, translates the external object identifiers to canonical object identifiers, adds the canonical object identifiers to the request, and forwards the request to the particular service. The translation layer may also remove one or more of the external object identifiers from the request before sending to the particular service (for data isolation).

20 Claims, 8 Drawing Sheets

TRANSPARENT SUPPORT AND TRANSLATION FOR CLIENT-PROVIDED IDENTIFIERS IN SERVICE REQUESTS

BACKGROUND

Provider networks may offer a variety of software services to clients in many industries around the globe. These services may be used to perform any number of functions for clients, such as providing compute power, database storage, and content delivery. For example, a company may use an e-commerce service of a provider network to host a website that allows customers to use a computing device (e.g., mobile phone or laptop) to browse product catalogs and to order products for shipment.

To perform a task, a service may receive a request (e.g., a service call) from a client, identify one or more resources based on the request, and perform various functions using the identified resources. For example, an e-commerce service may receive an inventory request that includes an object identifier for an object (e.g., a particular item for sale) and the service may use the object identifier to determine a quantity of the item that is available for shipment. The service may also use the object identifier in order to perform any number of tasks related to the particular item.

Referring to a resource in a request often relies on identifiers that are provided by, and understood by, the service (e.g., canonical identifiers). Some services may allow callers to provide their own identifiers (e.g., external identifiers) for resources. Although external identifiers may be convenient for a client to use, canonical identifiers are easier for a service to use. Various problems may arise when a client uses an external identifier in a request that is transmitted to the service, such as data format errors, identifier collisions, and violation of privacy or security policies.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for transparent support and translation for client-provided identifiers in service requests. Embodiments allow a service to process a service request from a client using a canonical identifier for one or more objects (e.g., an identifier used by the service to uniquely identify the one or more objects), even though the client provides their own external identifier for those objects in the request that may be different than the canonical identifiers. An identifier translation layer may by instantiated to perform any necessary translations of identifiers in requests to the service and for identifiers in responses to the client (e.g., without the need to modify code at the client or service or without knowledge by the client or service of the translations begin performed). Therefore, various embodiments provide "transparent" support for client-provided identifiers in service requests.

In embodiments, specification data may be provided to an identifier translation service. Using the specification data, the translation service may configure and/or instantiate a translation layer for a particular service to provide translation functionality, without the need for developers to generate new code for the particular service and/or client (or in some cases, generating a much smaller amount of code). Thus, embodiments provide a convenient way to reduce or eliminate problems such as data format errors, identifier collisions, and violation of privacy or security policies.

In various embodiments, any suitable security communication protocols may be used to protect data that is being sent between any devices, resources, and/or networks (e.g., provider network, client network, shared resources, etc.). For example, data may be encrypted using SSL (secure socket layer), TLS (transport layer security), HTTPS (secure hypertext transfer protocol), and/or any other suitable network security protocol.

Figure 1:
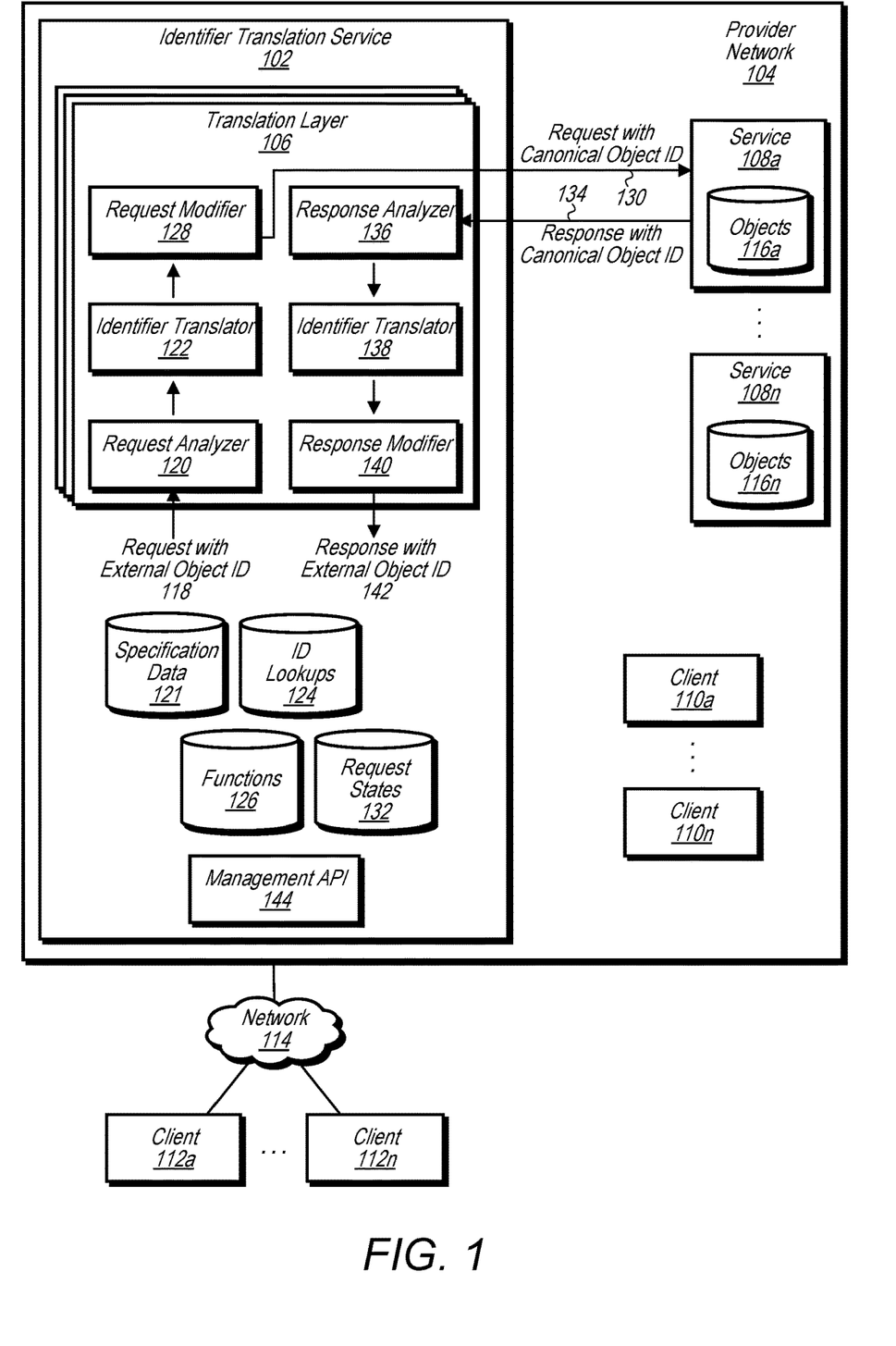
FIG. 1 illustrates a system for transparent support and translation for client-provided identifiers in service requests, according to some embodiments.

FIG. 1 illustrates a system for transparent support and translation for client-provided identifiers in service requests, according to some embodiments. In the illustrative embodiment, an identifier translation service 102 of a provider network 104 includes a translation layer 106 that receives requests directed to service 108 from one or more clients. In embodiments, any number of translation layers 106 may be configured and/or instantiated to process requests for any number of respective services 108 for the client or for multiple different clients.

In embodiments, clients may include internal clients 110 within the provider network and/or external clients 112 that are external to the provider network (e.g., remote clients at remote networks). As shown, a remote client may communicate with the provider network 104 over a wide area network 114 (e.g., the internet). In embodiments, a client may be a user (e.g., a person, computing device, and/or software application of a remote client network) that communicates with the service 108 and/or the identifier translation service 102. For example, a client may send requests to a service 108 and/or the identifier translation service 102 and receive responses to the request from the service 108 and/or the identifier translation service 102.

In embodiments, a given service 108 may include and/or access any number of objects 116 (e.g., data that represents an object of some type, such as a product, an order, a user, a subscription, an event that occurred, a catalog, a product category, etc.). In various embodiments, the given service may use respective canonical object identifiers ("canonical identifiers") to uniquely identify each of the objects.

As depicted, a client (e.g., client 112a) may provide their own external identifier for an objects in a request directed to a service (e.g., service 108a). In embodiments, a given request may include any number of external identifiers for respective objects. As discussed above, a given external identifier for an object 116 may be different than the canonical identifier for the same object 116.

In the example embodiment, the request 118 directed to the service 108a includes an external identifier for an object 116 that is different than the canonical identifier for the same object 116. In embodiments, the translation service 102 and/or the translation layer 106 intercepts the request so that the translation layer 106 receives the request instead of the service 108a. During configuration and/or instantiation of the translation layer 106, various network modifications may be made (e.g., software and/or hardware changes for routing requests) so that the translation layer 106 intercepts the request. As discussed below, the translation layer may perform, based on specification data for a given service, various operations in order to translate an external object identifier(s) and/or a request.

In response to receiving the request 118, the translation layer may translate the external identifier to a canonical identifier for the object. In embodiments, the translation may include analyzing the request using a request analyzer 120 (e.g., based on specification data 121) to obtain the external identifier. For example, the request analyzer may parse the request (e.g., based on specification data) to obtain and/or determine the external identifier.

In some embodiments, the translation layer may analyze the request (e.g., based on specification data) to locate and obtain one or more identifiers and then the translation layer may determine (e.g., based on specification data), whether each of the obtained one or more identifiers is an external identifier or a canonical identifier for one of the plurality of objects. In response to determining that an obtained identifier is an external identifier, the translation service may translate the external identifier to the canonical identifier and add the canonical identifier to the request. In response to determining that an obtained identifier is a canonical identifier, the translation service may maintain the canonical identifier in the request (e.g., leave it in the request). After performing the above steps for each identifier, the translation service may then forward the request to the service. In some embodiments, the translation service may remove any number of the external identifiers from the request before forwarding it (e.g., for data isolation/data security).

In embodiments, any of the steps/actions described herein that are performed by the translation service, the translation layer, and/or the identifier translator (e.g., receiving, determining, analyzing, translating, modifying, adding, removing, forwarding, instantiating, calling functions, etc.) may be based on specification data (e.g., provided by a client or user of the translation service and/or administrator or other entity associated with the translation service or provider network). For example, one or more functions may be generated based on the specification data provided for a particular service and triggered to perform some or all of the steps/actions described herein to process/translate requests and responses.

In embodiments in which the external identifier is obtained, an identifier translator 122 translates (e.g., based on specification data), the external identifier to a canonical identifier for the object. The identifier translator 122 then performs a lookup on a table (e.g., ID lookups 124) to determine the canonical identifier that corresponds to the external identifier. In some embodiments, the identifier translator 122 instead performs a function (e.g., a hash function or other modification function) to transform the external identifier to the canonical identifier. In some embodiments, two or more external identifiers may translate to the same canonical identifier. In embodiments, this may allow multiple different applications that belong to the same client (e.g., different applications within a client network) to make calls to a particular service using different external identifiers that are translated to the same canonical identifier.

In embodiments, a modification function may apply one or more translation rules to modify (e.g., translate) an external identifier to a canonical identifier for requests or in the reverse direction for responses. For example, the translation service may perform a modification function to modify one or more external identifiers based on other content included in the request (e.g., content of one or more other fields, such as external identifiers, canonical identifiers, version number, etc.) As another example, the translation service may perform a modification function to modify one or more external identifiers based on a format of the request (e.g., the presence or absence of one or more fields, type of data delimiters used in one or more of the fields, etc.). As shown, the translation service may store any number of functions 126 that may be used for translating any number of respective external identifiers to canonical identifiers for requests as described herein (and vice-versa for responses, in embodiments).

In various embodiments, a request modifier 128 may then add the canonical identifier to the request. The translation layer 106 may then forward the request 130 to the service 108a. In some embodiments, a state information for the request may be stored (e.g., request states 132). In embodiments, the state information may include any information useful for translation, such as a mapping of the canonical identifier to the external identifier of the request. This may be useful, for example, if the canonical identifier and/or the external identifier is generated using a function (as opposed to using ID lookups 124).

In some embodiments, the request modifier 128 may remove the external identifier from the request before forwarding the request to the service 108a. This may provide data isolation from the service 108a for clients that do not wish to share the external identifiers with the service 108a or potentially other services (e.g., for sensitive or confidential client data). The modified request 132 with the canonical identifier may then be forwarded to the service 108a.

In embodiments, a process similar to that described above may be implemented by the translation layer 106 to modify a response 134 to the request 118 that is received from the service 108a, before forwarding the response to the client. As shown, the response analyzer 136 analyzes the response 134 (e.g., based on specification data), to obtain the canonical identifier. For example, the request analyzer may parse the response (e.g., based on specification data) to obtain and/or determine the canonical identifier.

In some embodiments, after the canonical identifier is obtained, an identifier translator 138 translates (e.g., based on specification data), the canonical identifier to the corresponding external identifier for the object. In various embodiments, the identifier translator 138 performs a lookup on a table (e.g., ID lookups 124) to determine the external identifier that corresponds to the canonical identifier. In some embodiments, the identifier translator 138 performs a function 126 (e.g., a hash function, modification function, or a reversible function) to transform the canonical identifier back into the external identifier. In embodiments, an external object identifier may be an alphanumerical string, number, word, or any other content used by a client to identify a particular object that may be different than the content of a canonical object identifier used by a service to identify the of the same particular object. In an example embodiment, an external identifier for an object may be "alpha123," whereas the corresponding canonical identifier for the same object may be "beta777" or "33" or "A_1."

In various embodiments, the identifier translator 138 looks up the corresponding external identifier stored in request states 132 (e.g., the mapping of the canonical identifier to the external identifier the request in the state information). In various embodiments, a response modifier 140 may then add the external identifier to the response 134. The translation layer 106 may then forward the modified response 142 to the client that originally submitted the request.

In embodiments, the response modifier 140 may remove the canonical identifier from the response before forwarding the response to the client. This may provide data isolation from the client to prevent sharing the canonical identifier with the client and potentially other entities (e.g., for sensitive or confidential service data). The modified response 134 with the external identifier may then be forwarded to the client.

Although different components are shown for handling a response for a given request, in embodiments the functionality of any number of the depicted components be handled by one component. For example, the request analyzers 120, 136 may represent the same request analyzer, the identifier translators 122, 138 may represent the same identifier translator, the request modifier 128 and the response modifier 140 may represent the same response modifier, or all of the components may be a part of one request/response handler component.

In the example embodiment, a client may configure and/or instantiate the translation layer 106 via a management API 144 (application programming interface). For example, the translation service may receive, via the API 144, specification data for a particular service 108. The specification data may include information for translating external identifiers for one or more objects to canonical identifiers for the one or more objects used by the service. This information may include any information necessary for the translation service to configure and/or instantiate the translation layer 106 to begin processing requests from the client as described herein (e.g., identifying various fields of incoming requests to the particular service, such as the external identifier fields and/or the canonical identifier fields, applying translation rules based on request types or versions, etc.).

In embodiments, the specification data 121 may be transmitted and/or stored in any suitable format (e.g., one or more specification files, a series of fields provided via a graphical user interface, one or more database tables, in volatile memory, in non-volatile memory, etc.). In various embodiments, any number of clients may use the translation service for making service calls and receiving responses from any number of services. For example, the translation service may receive additional specification data for another service (e.g., from the same client or a different client), wherein the additional specification data includes different information for translating other external identifiers for one or more other objects to other canonical identifiers for the one or more other objects accessed by the other service.

In various embodiments, specification data for a particular service received from a particular client by the translation service may be specific to the relationship between the particular service and that particular client. In other words, a different client may submit different specification data for the same service (e.g., due to different request formats used by the different clients, different external identifiers used by the different clients, different translation rules used by the different clients, etc.). In some embodiments, specification data for a particular service received from a particular client by the translation service may be specific to the relationship between the particular service and a particular application of the particular client. In other words, a particular client may submit different specification data for the same service (e.g., due to different request formats used by the different applications, different external identifiers used by the different applications, different translation rules used by the different applications, etc.).

In embodiments, any other suitable information may be provided for in the specification data for handling incoming requests. For example, the file may indicate a list of canonical identifiers and corresponding operations that are authorized to be performed for the objects indicated by the canonical identifiers. During processing of the request, the translation layer may determine based at least on a canonical identifier and an operation indicated by the request, whether the request is authorized. If the translation layer determines that the request is authorized, it may allow processing of the request to continue and/or forward the request including the one or more canonical identifiers to the service. If not, then the translation layer may deny further processing of the request and/or indicate to the client that the request is not authorized.

Figure 2A:
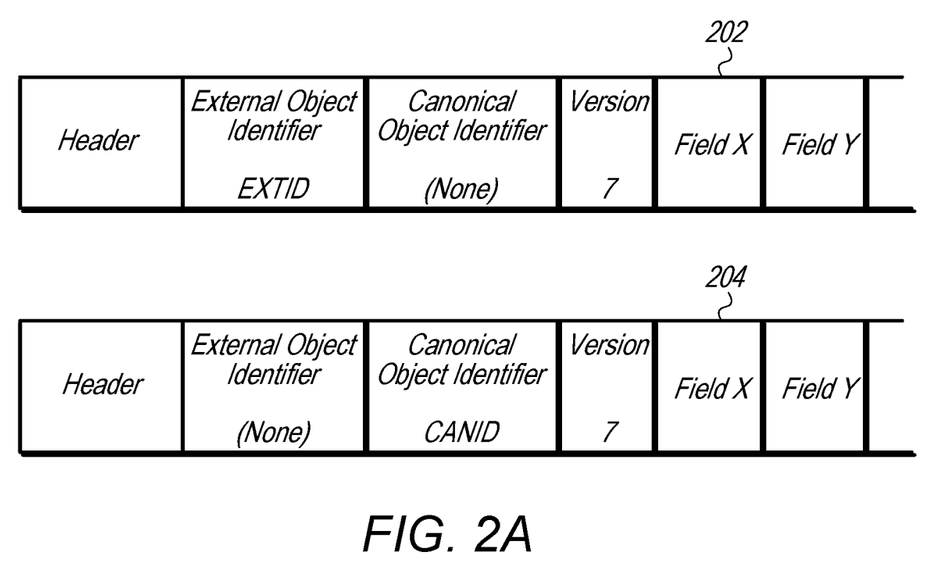
FIG. 2A illustrates fields of a request that may include an external object identifier and a canonical object identifier, according to some embodiments.

FIG. 2A illustrates fields of a request that may include an external object identifier and a canonical object identifier, according to some embodiments. In the depicted embodiment, a request 202 includes an external identifier field with the value "EXTID" and a canonical identifier field without a value (e.g., null). In the depicted example, the translation layer modifies the request 202 by stripping out the external identifier and adding "CANID" to the canonical identifier field to generate the modified request 204. The modified request is then forwarded to the service.

In the depicted embodiment, the external identifier field and the internal identifier field are located within the body of the request, as opposed to the header. Thus, in embodiments the translation service translates and modifies data within the body of the request (e.g., object identifiers) without changing any header and/or routing information. Therefore, the modifications that the translation service performs to the request and/or response may be content-driven (e.g., based on how a client or service identifies objects).

In embodiments, the specification data provided to the translation service may provide support for multiple versions of a request and response formats. For example, the translation service may identify a particular format version based on analyzing content of one or more fields of a request in the body or header and/or determining whether one or more fields exist. After identifying the particular version for a request, the translation service may then locate and obtain the one or more external object identifiers and modify the request (e.g., according to the specification data).

Thus, the specification data may indicate where to locate/obtain object identifiers (e.g., what fields contain the identifiers) after identifying the request or response version and/or how to modify the request or response after obtaining the identifiers (e.g., whether or not to strip out the external object identifier of a request from a client or the canonical object identifier of a response to a client). In other words, different translation rules may be used, depending on what version (e.g., type) of request or response is received.

In an embodiments, the translation service may determine, based on the specification data (e.g., by invoking functions in the translation layer), whether the request includes one or more canonical identifiers from one or more corresponding objects. In response to determining that the request does include the one or more canonical identifiers, the translation service may forward the request including the one or more of the canonical identifiers to the target service. If not, then the translation service may translate the one or more identifiers, insert them into the request, and forward the request on. In embodiments, one or more of the identifiers may be canonical and one or more may be external. In such cases, the translation service may translate any number of the external identifiers to canonical identifiers (from none to all), insert them into the request, and forward the request on (one or more of the external identifiers may be removed from the response depending on translation rules). The reverse process may occur for translating identifiers from canonical to external in responses. Thus, any number of canonical identifiers may be translated to external identifiers, inserted into the response, and forwarded to the client (one or more of the canonical identifiers may be removed from the response depending on translation rules).

In some embodiments, the translation service may determine the version of the received request based on metadata in the request header or other out-of-band metadata. For example, the translation service may determine that the request is in a version "2" format because a field in the header includes the value "2." In response, the translation service may obtain the object identifier(s) from one or more particular locations within the body, based on the specification data that includes information for locating object identifiers for version "2" requests (e.g., the tenth field of content within the body of the message or after a unique identifier within the content).

In embodiments, the translation service may determine the version of the received request based on port numbers or DNS (domain name system) names of the request. For example, a request that is received at a particular port number or with a particular DNS name/address may be determined as a request with a version "3" format.

In an embodiment, a particular field in the request may explicitly indicate the version number (e.g., a field in the body of the request may include the number "7"). The translation service may determine the version of the received request to be version "7" based on the particular field having a value of "7." The translation service may apply rules based on whether certain fields exist. For example, the translation service may determine that a request is a version "1" request if it has a field "X" and a field "Y," but is a version "2" request if it has a field "X" but no field "Y."

In embodiments, the translation service may determine the version of the received request based on analysis of the format of data of one or more fields. For example, if the data in field "X" has comma-delimited values, then it is version "1" and if it has colon-delimited values, then it is version "2." Any of the above techniques may be used by the translation service (e.g., after being configured by the specification data) to determine the version/type of a request or response, how to locate/obtain the one or more identifiers in the request or response (e.g., based on the version number/type of the request), how to translate the one or more identifiers in the request or response (e.g., based on the version number/type of the request), whether an object identifier is for an external or internal object (e.g., based on the version number/type of the request), and/or how to modify the request or response (e.g., based on the version number/type of the request). For example, version "1" requests may have the external identifier removed before forwarding on to the service, whereas version "3" requests may maintain the external identifier as part of the request to forward on to the service. Thus, version "1" may indicate a higher data security/isolation policy than version "3."

Figure 2B:
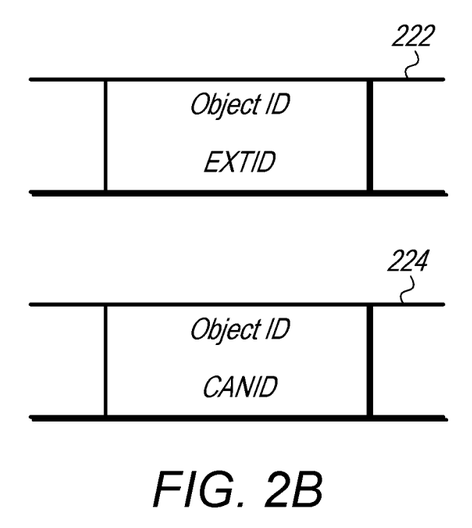
FIG. 2B illustrates a field of a request that may include an external object identifier or a canonical object identifier, according to some embodiments.

FIG. 2B illustrates a field of a request that may include an external object identifier or a canonical object identifier, according to some embodiments. In the depicted embodiment, a particular version of a request 222 includes an object identifier field with the value "EXTID," but does not include any other object identifier. In the depicted example, the translation layer modifies the request 222 (e.g., based on a translation rule for the particular version of the request) by replacing the external identifier with the canonical identifier "CANID" to generate the modified request 224. The modified request is then forwarded to the service. To handle the different types of requests shown in FIGS. 2A and 2B, clients may provide different specification data. Thus, clients have the flexibility to configure different translation layers that handle different request formats by providing different specification data.

In embodiments, the translation service may handle different types (e.g., versions) of requests for a particular service over time. Thus, the translation service may handle dynamically changing request formats over time. In some embodiments, new specification data may be provided to the translation service to efficiently update the configuration of the service so that it can handle new request formats. This allows for the translation service to be updated over a period of time to handle changing request formats.

Figure 3:
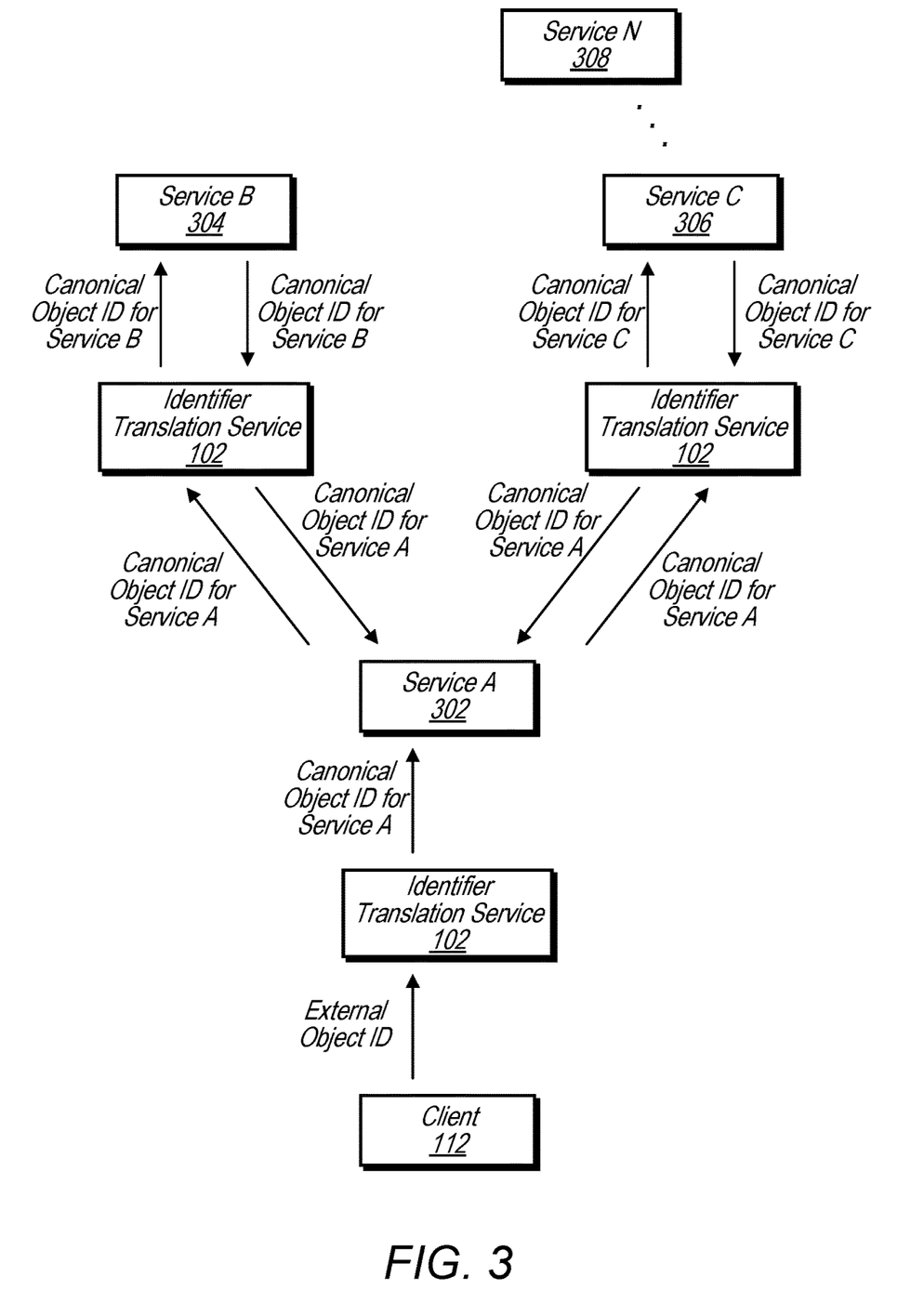
FIG. 3 illustrates translation of object identifiers between different services, according to some embodiments.

FIG. 3 illustrates translation of object identifiers between different services, according to some embodiments. In the depicted embodiment, the translation service 102 may handle requests and/or responses between any number of services, in addition to those for the client.

For example, the translation service may handle requests and responses between client 112 and service A 302, between service A and service B 304, between service A 302 and service C 306, and between any number of other services 308. Thus, in embodiments, translations between a canonical identifier of one service and a canonical identifier of another service may be handled in the same manner or similar manner as described above for translations between an external identifier of a client an a canonical identifier of a service (e.g., using a canonical identifier of a service instead of using the external identifier of the client). For example, service A may behave as a client of service B, since it is sending a request to service B. In some embodiments, translation of a canonical identifier between services may result in the canonical identifier remaining the same (e.g., if both service use the same canonical identifier for an object).

Figure 4:
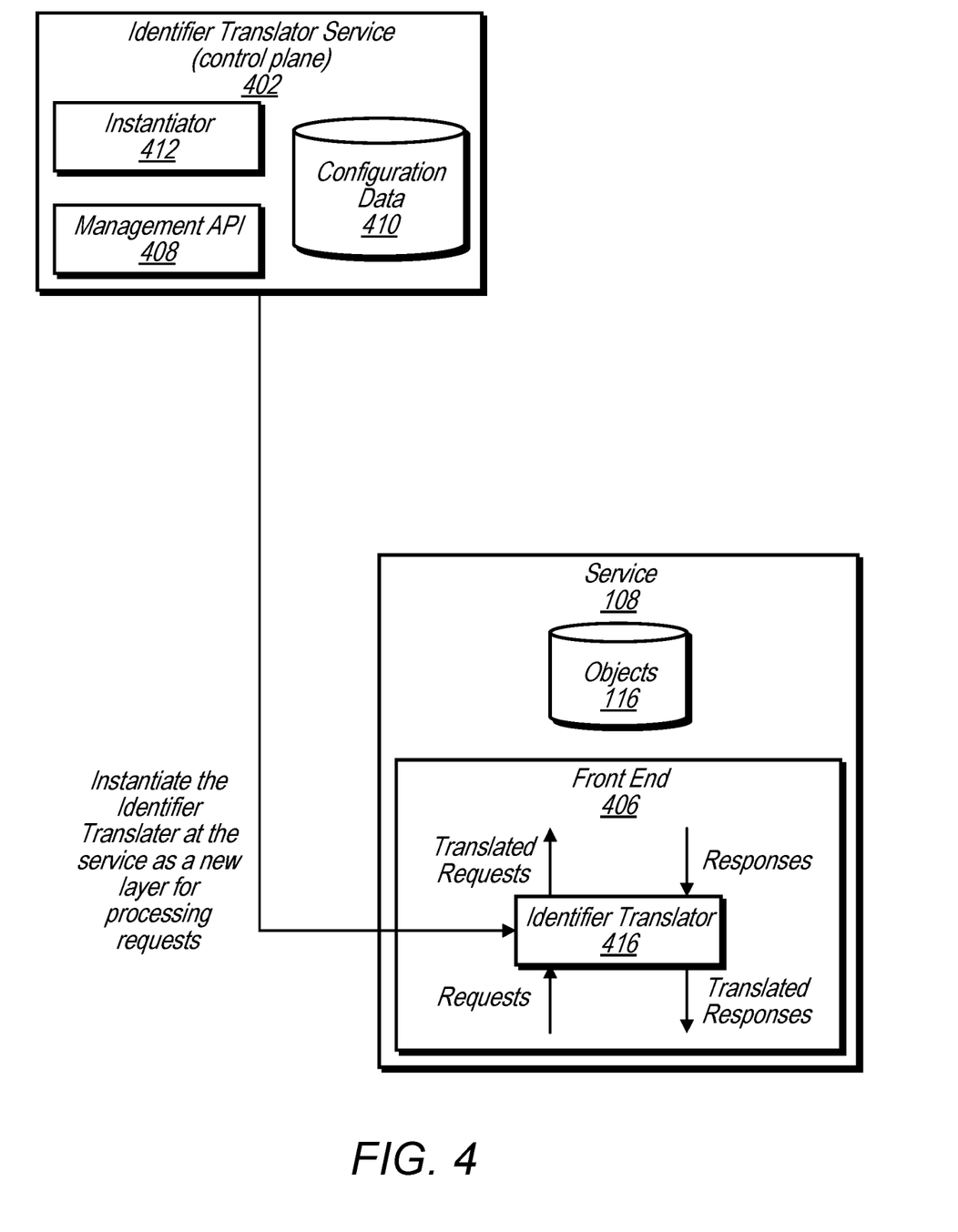
FIG. 4 illustrates a system for instantiating an identifier translator at a service, according to some embodiments.

FIG. 4 illustrates a system for instantiating an identifier translator at a service, according to some embodiments. In the depicted embodiment, an identifier translator service includes a control plane component 402 that is used to instantiate an identifier translator 404 (e.g., data plane component) within a front end 406 of the service 108.

In embodiments, a client may provide, via a management API 408, specification data and/or any other data necessary to configure the identifier translator 404. In embodiments, this data may be stored in configuration data 410. The client may then cause the instantiator to instantiate the identifier translator 404 within the front end 406 (e.g., within the request handling logic, load balancer(s), or any other hardware and/or software of the front end 406 of the service 108).

In some embodiments, the identifier translator 404 may instead be instantiated as a separate service. For example, the identifier may be instantiated outside of the service 108 on separate hardware and/or software and service as a proxy to translate requests and responses between a client and the service 108 (e.g., as described for FIG. 1). In some embodiments, the identifier may be instantiated outside of the service 108 on separate hardware and/or software and service as a proxy to translate requests and responses between services (e.g., as described for FIG. 3). In various embodiments, any number of instances of the identifier translator may be instantiated between any number of clients and service and/or between any number of services. In embodiments, the identifier translator 404 includes some or all of the functionality described for the translation layer 106 of FIG. 1.

Figure 5:
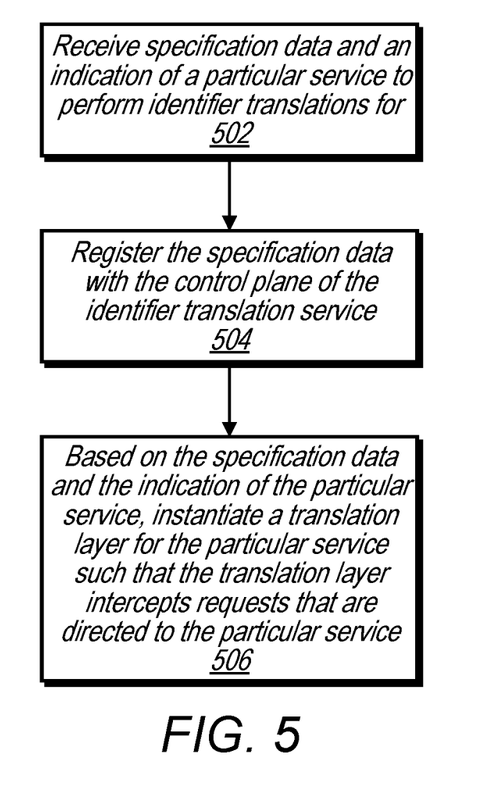
FIG. 5 is a flow diagram that illustrates configuring and instantiating a translation layer for a particular service, according to some embodiments.

FIG. 5 is a flow diagram that illustrates configuring and instantiating a translation layer for a particular service, according to some embodiments. At block 502, the translation service receives specification data and an indication of a particular service to perform identifier translations for.

At block 504, the translation service registers the specification data with the control plane of the translation service. As discussed herein, the specification data may be a collection of data in any suitable format. For example, the specification data may be stored as a specification file of a particular format. At block 506, the translation service instantiates a translation layer for the particular service such that the translation layer intercepts requests that are directed to the particular service.

Figure 6:
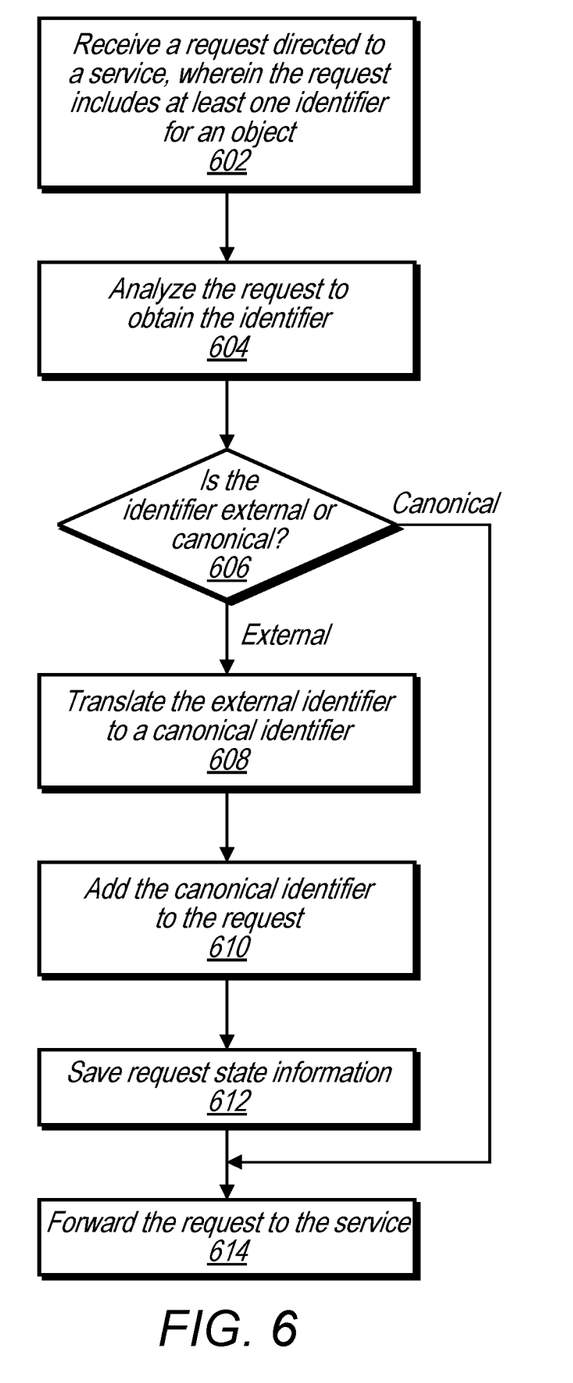
FIG. 6 is a flow diagram that illustrates translating a client-provided object identifier in a request and forwarding the request to a service, according to some embodiments.

FIG. 6 is a flow diagram that illustrates translating a client-provided object identifier in a request and forwarding the request to a service, according to some embodiments. At block 602, the translation service receives a request directed to a service. The request includes at least one identifier for an object of the service.

At block 604, the translation service analyzes the request to obtain the identifier (e.g., via parsing). At block 606, the translation service determines whether the identifier is external or canonical. If the translation service determines that the identifier is canonical, then the process continues to block 614, where the translation service forward the request to the service.

If the translation service determines that the identifier is external, then at block 608, the translation service translates the external identifier to the canonical identifier. At block 610, the translation service adds the canonical identifier to the request. At block 612, the translation service saves state information for the request. At block 614, the translation service forward the request to the service. In embodiments, any number of identifiers may be processed before forwarding the request to the service. For example, blocks 606-612 may be performed for any number of identifiers of the request before forwarding the request to the service.

Figure 7:
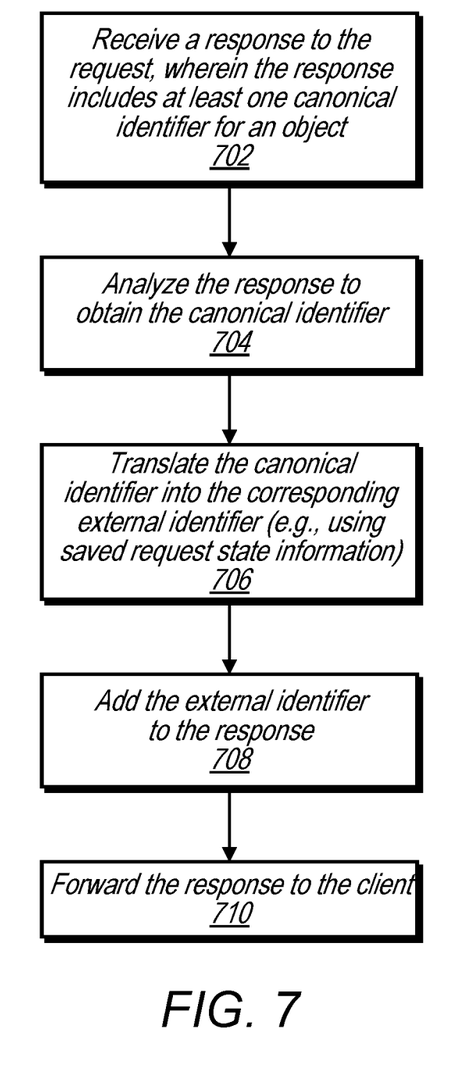
FIG. 7 is a flow diagram that illustrates translating a canonical object identifier in a response and forwarding the response to a client, according to some embodiments.

FIG. 7 is a flow diagram that illustrates translating a canonical object identifier in a response and forwarding the response to a client, according to some embodiments. At block 702, the translation service receives a response to the request (e.g., the request that was previously forwarded to the service in FIG. 6). The response includes at least one canonical identifier for the object.

At block 704, the translation service analyzes the response to obtain the canonical identifier. At block 706, the translation service translates the canonical identifier into the corresponding external identifier (e.g., using the saved request state information or using another technique as discussed herein). At block 708, the translation service adds the external identifier to the response. At block 710, the translation service forwards the response to the client.

Any of various computer systems may be configured to implement processes associated with the provider network, the identifier translation service, clients, or any component of the above figures. For example, FIG. 8 is a block diagram illustrating an example computer system that implements some or all of the techniques described herein, according to some embodiments.

Figure 8:
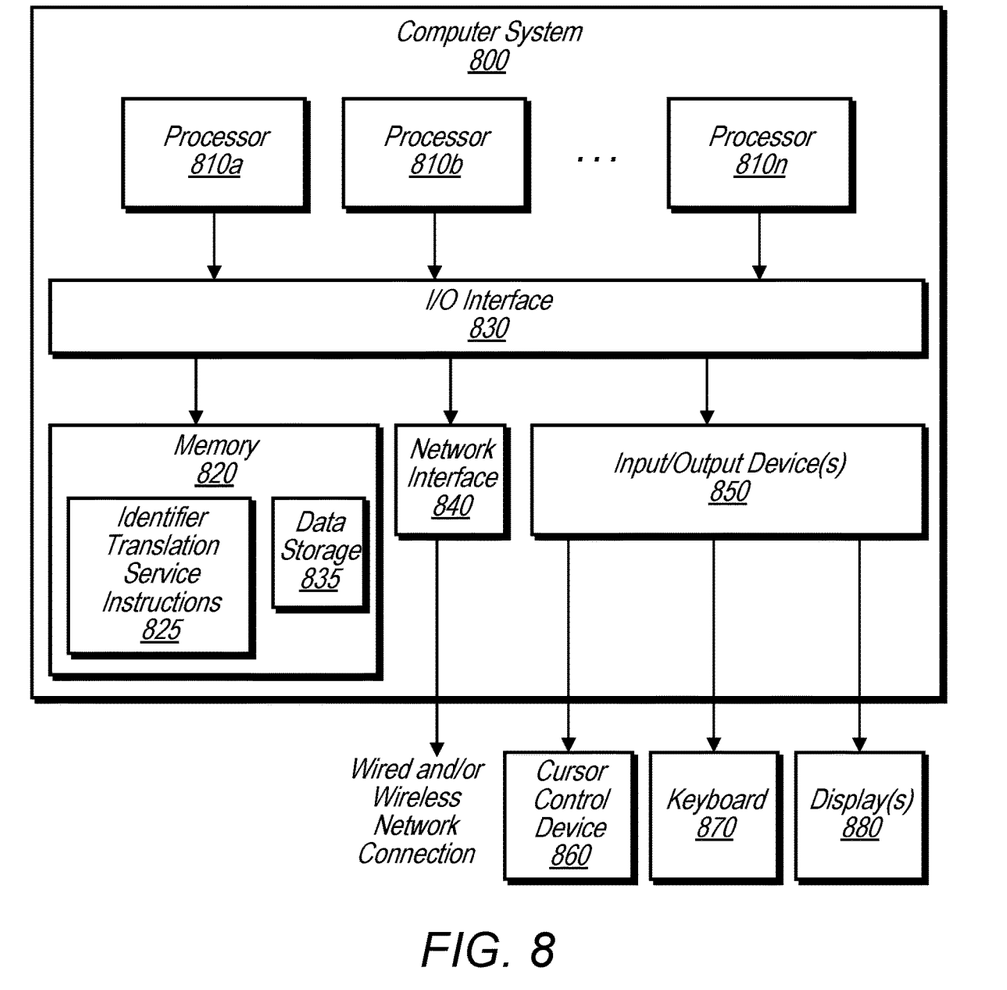
FIG. 8 is a block diagram illustrating an example computer system that implements some or all of the techniques described herein, according to some embodiments.

In various embodiments, the provider network, the identifier translation service, clients, or any other component of any of FIGS. 1-7 may each include one or more computer systems 800 such as that illustrated in FIG. 8. In embodiments, the provider network, the identifier translation service, clients, or any other component may include one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the identifier translation service, are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other computer systems 800 or devices attached to a network, such as the local network discussed above, a wide-area network, or a local network within the provider network, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device 860, keyboard 870, or display(s) 880 may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the identifier translation service, various services or devices of the provider networks, remote networks, clients/client networks, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices of a provider network comprising respective processors and memory to implement one or more services to provide access to respective pluralities of objects; and
   one or more computing devices of the provider network comprising respective processors and memory to implement an identifier translation service for the one or more services, wherein the identifier translation service is configured to:
   receive specification data for a particular one of the one or more services, wherein the specification data includes information for translating external identifiers for one or more objects to canonical identifiers for the one or more objects, wherein the particular service uses respective ones of the canonical identifiers to uniquely identify respective ones of the one or more objects;

receive, from a client of the particular service, a request directed to the particular service, wherein the request comprises at least one of the external identifiers for the one or more objects; and in response to receiving of the request:
translate, based on the specification data, the at least one external identifier to a respective one of the canonical identifiers for the one or more objects;
add the at least one canonical identifier to the request; and
forward the request including the at least one canonical identifier to the particular service.

2. The system as recited in claim 1, wherein the one or more services comprise a plurality of services, and wherein the identifier translation service is configured to:
receive additional specification data for another one of the services, wherein the additional specification data includes different information for translating other external identifiers for one or more other objects to other canonical identifiers for the one or more other objects, wherein the other service uses respective ones of the other canonical identifiers to uniquely identify respective ones of the one or more other objects.

3. The system as recited in claim 1, wherein the identifier translation service is configured to:
in response to receiving the request, determine, based on the specification data, whether the request includes one or more of the canonical identifiers for the one or more objects; and
in response to a determination that the request includes one or more of the canonical identifiers for the one or more objects, forward the request including the one or more of the canonical identifiers to the particular service.

4. The system as recited in claim 1, wherein the one or more computing devices are configured to implement the identifier translation service to perform:
receive, from the particular service, a response to the request;
add the at least one external identifier to the response; and
forward the response to the client.

5. The system as recited in claim 1, wherein the one or more computing devices are configured to implement the identifier translation service to:
provide a control interface to configure the identifier translation service for the one or more services;
receive, via the control interface, the specification data and an indication of the particular service; and
instantiate, based on the specification data and the indication, a translation layer for the particular service such that the translation layer intercepts requests that are directed to the particular service.

6. A method, comprising:
performing, by an identifier translation service of a provider network:
receiving specification data for a particular service, wherein the particular service provides access to a plurality of objects, and wherein the specification data includes information for translating external identifiers for one or more objects to canonical identifiers for the one or more objects, and wherein the particular service uses respective ones of the canonical identifiers to identify respective ones of the one or more objects;

receiving, from a client of the particular service, a request directed to the particular service, wherein the request comprises at least one of the external identifiers for the one or more objects; and in response to receiving the request:
translating, based on the specification data, the at least one external identifier to a respective one of the canonical identifiers for the one or more objects;
adding the at least one canonical identifier to the request; and
forwarding the request including the at least one canonical identifier to the particular service.

7. The method as recited in claim 6, further comprising:
receiving additional specification data for another service, wherein the additional specification data includes different information for translating other external identifiers for one or more other objects to other canonical identifiers for the one or more other objects, and wherein the other service uses respective ones of the other canonical identifiers to identify respective ones of the one or more other objects.

8. The method as recited in claim 6, further comprising:
removing the at least one external identifier from the request, wherein the forwarded request does not include the external identifier.

9. The method as recited in claim 6, further comprising:
receiving, from the particular service, a response to the request;
adding the at least one external identifier to the response; and
forwarding the response to the client.

10. The method as recited in claim 9, wherein the response comprises the at least one canonical identifier, and further comprising:
removing the at least one canonical identifier from the response, wherein the forwarded response does not include the removed at least one canonical identifier.

11. The method as recited in claim 6, further comprising:
providing a control interface to configure the identifier translation service for the one or more services;
receiving, via the control interface, the specification data; and
instantiating, based at least on the specification data, a translation layer for the particular service such that the translation layer intercepts requests that are directed to the particular service.

12. The method as recited in claim 6, further comprising:
receiving, from the particular service, a request directed to another service, wherein the request comprises at least one of the canonical identifiers for the one or more objects; and
in response to receiving the request:
translating, based on additional specification data for the other service, the at least one canonical identifier to a another respective canonical identifier used by the other service to identify a respective object;
adding the at least one other canonical identifier to the request; and
forwarding the request including the at least one other canonical identifier to the other service.

13. The method as recited in claim 6, wherein translating the at least one external identifier to a respective one of the canonical identifiers for the one or more objects comprises:

performing a lookup on a table to determine the at least one canonical identifier that corresponds to the at least one external identifier, performing a hash function to transform the at least one external identifier to the at least one canonical identifier, performing a modification function to modify the at least one external identifier based on other content included in the request, or performing a modification function to modify the at least one external identifier based on a format of the request.

14. The method as recited in claim 6, further comprising:
prior to the translating of the at least one external identifier:
analyzing, based on the specification data, the received request to obtain the at least one external identifier.

15. One or more non-transitory computer-accessible storage media storing program instructions that when executed on or across one or more processors cause the one or more processors to implement an identifier translator to:
receive, from a client of a service, a request directed to the service, wherein the service provides access to a plurality of objects, and wherein the request comprises one or more identifiers for one or more of the plurality of objects, and wherein the identifier translator is instantiated to process requests for the service in accordance with specification data, the specification data including information for translating external identifiers for the one or more objects to canonical identifiers for the one or more objects;
analyze the received request to obtain the one or more identifiers; and
for individual ones of the obtained identifiers:
determine, based on the specification data, whether the identifier is an external identifier or a canonical identifier for one of the plurality of objects, wherein the service uses the canonical identifier to uniquely identify the object;
in response to a determination that the identifier is the external identifier:
translate the external identifier to the canonical identifier;
add the canonical identifier to the request; and
in response to a determination that the identifier is the canonical identifier:
maintain the canonical identifier in the request; and
forward the request including the one or more canonical identifiers to the service.

16. The one or more storage media as recited in claim 15, further comprising program instructions that when executed on or across the one or more processors further cause the one or more processors to:
in response to the determination that the identifier is the external identifier:
remove the external identifier from the request, wherein the forwarded request does not include the external identifier.

17. The one or more storage media as recited in claim 15, further comprising program instructions that when executed on or across the one or more processors further cause the one or more processors to:
receive, from the service, a response to the request, wherein the response comprises the one or more canonical identifiers;
analyze the received response to obtain the one or more canonical identifiers;
for individual ones of the obtained canonical identifiers:
translate the canonical identifier to a corresponding external identifier; and
add the corresponding external identifier to the request; and
forward the response including the one or more added external identifiers to the client.

18. The one or more storage media as recited in claim 17, further comprising program instructions that when executed on or across the one or more processors further cause the one or more processors to:
for the individual ones of the obtained canonical identifiers:
remove the canonical identifier from the response, wherein the forwarded response does not include the removed one or more canonical identifiers.

19. The one or more storage media as recited in claim 15, wherein to translate the external identifier to the canonical identifier, the program instructions when executed on or across the one or more processors cause the one or more processors to:
perform a lookup on a table to determine the canonical identifier that corresponds to the external identifier,
perform a hash function to transform the external identifier to the canonical identifier,
perform a modification function to modify the external identifier based on other content included in the request, or
perform a modification function to modify the external identifier based on a format of the request.

20. The one or more storage media as recited in claim 15, further comprising program instructions that when executed on or across the one or more processors further cause the one or more processors to:
determine, based at least on the one or more canonical identifiers and one or more respective operations indicated by the request, that the request is authorized; and
in response to determining that the request is authorized, forward the request including the one or more canonical identifiers to the service.

* * * * *